United States Patent
Axmon et al.

(10) Patent No.: US 10,454,744 B2
(45) Date of Patent: Oct. 22, 2019

(54) DOWNLINK TIME TRACKING IN A NB-LOT DEVICE WITH REDUCED SAMPLING RATE

(71) Applicant: Telefonaktiebolaget LM Ericsson (publ), Stockholm (SE)

(72) Inventors: Joakim Axmon, Limhamn (SE); Dandan Hao, Beijing (CN); Bengt Lindoff, Bjärred (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/076,176

(22) PCT Filed: Feb. 10, 2017

(86) PCT No.: PCT/EP2017/053016
§ 371 (c)(1),
(2) Date: Aug. 7, 2018

(87) PCT Pub. No.: WO2017/140591
PCT Pub. Date: Aug. 24, 2017

(65) Prior Publication Data
US 2019/0268204 A1 Aug. 29, 2019

(30) Foreign Application Priority Data

Feb. 15, 2016 (WO) ............... PCT/CN2016/073779

(51) Int. Cl.
*H04L 27/26* (2006.01)
(52) U.S. Cl.
CPC ...... *H04L 27/2665* (2013.01); *H04L 27/2663* (2013.01); *H04L 27/2672* (2013.01); *H04L 27/2675* (2013.01); *H04L 27/2695* (2013.01)
(58) Field of Classification Search
CPC ..... H04B 1/7115; H04B 1/7077; H04L 7/041; H04L 27/2626; H04L 27/2647;
(Continued)

(56) References Cited

U.S. PATENT DOCUMENTS

| | | | |
|---|---|---|---|
| 6,925,112 B1* | 8/2005 | Morejon | H04L 25/0228 375/222 |
| 7,573,944 B2 | 8/2009 | Chang et al. | |

(Continued)

FOREIGN PATENT DOCUMENTS

| | | |
|---|---|---|
| RU | 2369030 C2 | 9/2009 |
| WO | 9703509 A1 | 1/1997 |

(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Requirements for support of radio resource management (Release 12)", Technical Specification, 3GPP TS 36.133 V127.0, Mar. 1, 2015, pp. 1-1014, 3GPP, France.

(Continued)

*Primary Examiner* — Khanh C Tran
(74) *Attorney, Agent, or Firm* — Coats & Bennett, PLLC

(57) ABSTRACT

The solution presented herein discloses a method of transmitting first symbols via a transceiver comprising a receiver and a transmitter. The method comprises determining a timing discrepancy between a previous reference timing and a current reference timing. The current reference timing is established responsive to a reduced sampling rate used to process second symbols received by the receiver, where the reduced sampling rate is less than a minimum sampling rate at which an inter-symbol distance between the second symbols can be represented by an integer number of samples. The method further comprises adjusting the current reference timing responsive to the timing discrepancy to generate an adjusted reference timing, and determining an uplink transmission timing responsive to the adjusted reference timing. The method further comprises transmitting the first symbols via the transmitter according to the determined (Continued)

uplink transmission timing. Corresponding transceiver, transceiver apparatus, and computer program product are also disclosed.

25 Claims, 14 Drawing Sheets

(58) Field of Classification Search
CPC . H04L 7/0004; H04L 7/0029; H04L 27/2665; H04L 27/2695; H04L 27/2663; H04L 27/2672; H04L 27/2675
See application file for complete search history.

(56) References Cited

U.S. PATENT DOCUMENTS

| | | | |
|---|---|---|---|
| 8,279,988 B2 | 10/2012 | McKown | |
| 8,687,617 B2 | 4/2014 | Agrawal et al. | |
| 2003/0156534 A1 | 8/2003 | Coulson et al. | |
| 2004/0184551 A1 | 9/2004 | Liu et al. | |
| 2005/0084025 A1 | 4/2005 | Chen | |
| 2007/0064839 A1 | 3/2007 | Luu | |
| 2007/0274416 A1 | 11/2007 | Ishii | |
| 2008/0063034 A1* | 3/2008 | Yang | H04B 1/7115 375/148 |
| 2008/0123592 A1 | 5/2008 | Popovic | |
| 2008/0292027 A1 | 11/2008 | Liu et al. | |
| 2010/0166050 A1 | 7/2010 | Aue | |
| 2010/0260276 A1 | 10/2010 | Orlik et al. | |
| 2011/0224996 A1* | 9/2011 | Wang | H04L 7/0029 704/503 |
| 2012/0032855 A1 | 2/2012 | Reede et al. | |
| 2013/0005327 A1* | 1/2013 | Flanagan | H04W 4/029 455/422.1 |
| 2014/0233723 A1* | 8/2014 | Lou | G10L 21/02 379/406.01 |
| 2014/0256277 A1 | 9/2014 | Ki et al. | |
| 2015/0139190 A1 | 5/2015 | Patel et al. | |
| 2017/0033887 A1 | 2/2017 | Lei et al. | |
| 2018/0123845 A1 | 5/2018 | Hill et al. | |
| 2019/0013913 A1 | 1/2019 | Suzuki et al. | |

FOREIGN PATENT DOCUMENTS

| | | |
|---|---|---|
| WO | 2017013533 A1 | 1/2017 |
| WO | 2017140590 A1 | 8/2017 |

OTHER PUBLICATIONS

Nieul Ltd, et al., "NB-Clot—Introduction", 3GPP GERAN Adhoc#3 on FS_IoT_LC, Jun. 29, 2015, pp. 1-5, GPC150389, Agenda item 1.4.2.5, 2.4.1.5, Jun. 29-Jul. 2, 2015.

Huawei Technologies Co. Ltd., "NB M2M Overview of the Physical Layer Design", 3GPP TSG GERAN #63, Ljubljana, Slovenia, Aug. 25, 2014, pp. 1-12, GP-140563, Agenda Item: 7.1.5.35.

Qualcomm Incorporated, "Narrow band OFDMA based proposal for GERAN Cellular IoT", Discussion, 3GPP TSG GERAN #64, San Francisco, USA, Nov. 17, 2014, pp. 1-17, Tdoc GP-140839.

Intel Corporation, "On Device complexity for NB-IoT", 3GPP TSG RAN WG1 Meeting #83, Anahein, USA, Nov. 16, 2015, pp. 1-10, R1-156524, 3GPP.

Ericsson, "Analysis of Uplink Transmit Timing in IB-IoT", 3GPP TSG RAN WG4 Meeting #78bis, San Jose del Cabo, Mexico, Apr. 11, 2016, pp. 1-7, R4-161945, 3GPP.

Qualcomm Incorporated, "On DL Tone Spacing for Standalone Operation", 3GPP TSG RAN WG1#83, Anaheim, US, Nov. 15, 2015, pp. 1-7, R1-157065, 3GPP.

* cited by examiner

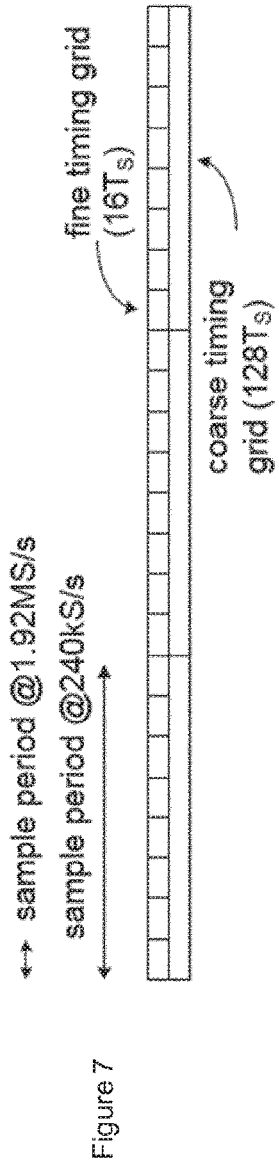
Figure 7
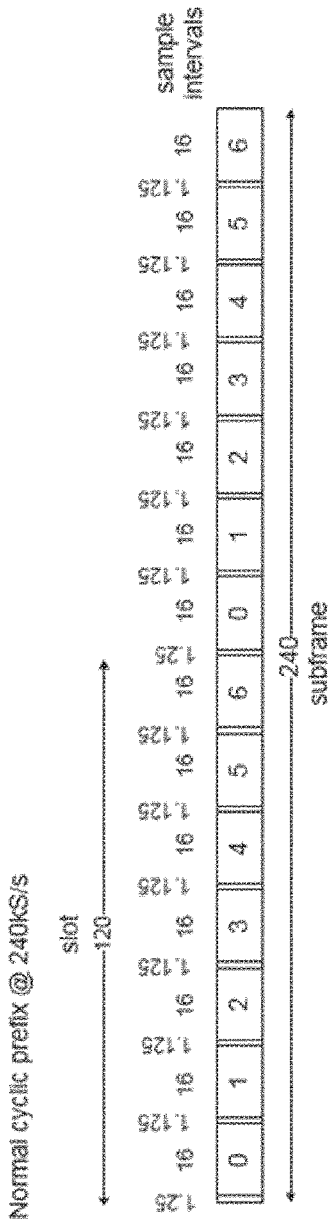
Figure 8
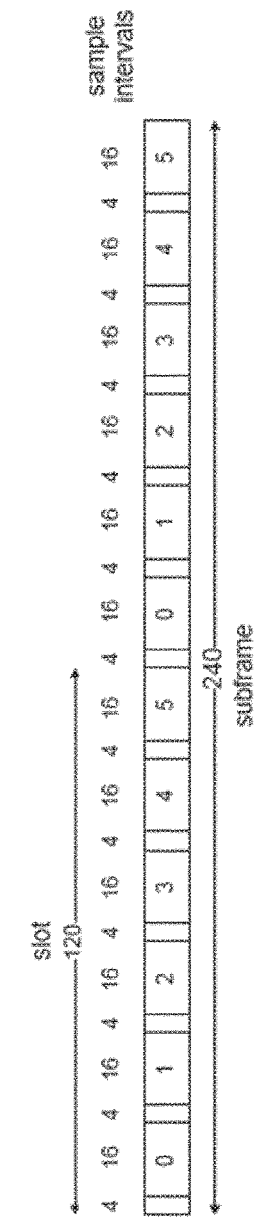

DOWNLINK TIME TRACKING IN A NB-LOT DEVICE WITH REDUCED SAMPLING RATE

BACKGROUND

Internet-of-Things (IoT) is the vision of virtually all objects being connected to the internet, where the objects can be anything from simple sensors to sophisticated machinery, such as vehicles. The Third Generation Partnership Project (3GPP) is currently specifying a new kind of radio access technology (RAT) with strong commonalities with Long Term Evolution (LTE) but operating over a narrower bandwidth. The new RAT is referred to as Narrow-Band IoT (NB-IoT). Specification work is currently ongoing, and the following decisions regarding deployment scenarios and duplex modes, downlink channels and signals, uplink channels and signals, and channel raster, were made at the 3GPP RAN1#83 meeting in November 2015.

Regarding deployment scenarios and duplex modes, three deployment scenarios were specified:
  standalone deployment;
  deployment in guard band between conventional LTE cells; and
  deployment within the band of conventional LTE cells.

Both Frequency Division Duplex (FDD) and Time Division Duplex (TDD) modes are in the scope but are covered in different releases (e.g., FDD is in Release 13 but the solution shall be forward compatible with TDD which is introduced in a later release).

Regarding downlink channels and signals, the downlink subcarrier spacing is proposed to be 15 kHz and the NB-IoT downlink system bandwidth is proposed to be 200 kHz, with an efficient bandwidth of 180 kHz (e.g., the equivalent to a physical resource block in a conventional LTE cell). Two configurations for cyclic prefix (CP) are considered: normal and extended. FIG. 6 shows an exemplary downlink resource grid (in a time-frequency representation) for a Normal Cyclic Prefix (NCP) and for an Extended Cyclic Prefix (ECP), where the shaded areas indicate where NB-IoT-specific synchronization signals may be scheduled. The number of transmission ports used by the network node is assumed to be one or two, where for the latter, Space-Frequency Block Coding (SFBC) is assumed. The NB-IoT-specific channels that have been specified to some extent are the broadcast channel (NB-PBCH), the downlink control channel (NB-PDCCH or NPDCCH), and the downlink shared channel (NB-PDSCH). It shall be noted that the nomenclature is not finalized, but the indicated names are used here to distinguish the channels from their counterparts in regular LTE cells. System information is provided via a master information block that is transmitted on the NB-PBCH and for which format and allocation is known in advance, and via system information block(s) that are transmitted on NB-PDSCH.

Further, new synchronization signals, e.g., NB Primary Synchronization Signal (NB-PSS or NPSS) and NB Secondary Synchronization Signal (NB-SSS or NSSS), are Introduced, with, e.g., a single instance of NB-PSS and 504 instances of NB-SSS. The synchronization signals occupy a fixed number of Orthogonal Frequency Division Multiplexing (OFDM) symbols in each subframe that is carrying synchronization signals.

The synchronization signals do not occupy the first three OFDM symbols in the subframe, and for the scenario where NB-IoT is deployed in the bandwidth of a regular LTE cell, Cell-specific Reference Signals (CRSs) of that regular LTE cell will puncture the NB-PSS or NB-SSS if necessary. For NCP, it is assumed that the NB-PSS and NB-SSS span nine or eleven OFDM symbols (to be down-selected to one value), and that within the span six to eleven OFDM symbols carry the synchronization information (to be down-selected to one value). For ECP, the corresponding figures are nine OFDM symbols and six to nine OFDM symbols, respectively. For the in-band scenario, NB-PSS and NB-SSS are boosted by 6 dB relative to the cell-specific reference signal (CRS) power level in the regular LTE cell. The repetition rates of NB-PSS and NB-SSS might differ. For example, repetition rates of 20 ms and 80 ms, respectively, have been proposed.

Regarding uplink channels and signals, two solutions are proposed for uplink transmissions: single-tone transmissions using either of two configurations, e.g., 3.75 kHz and 15 kHz bandwidth, and multi-tone transmission using 15 kHz sub-carrier spacing in a Single Carrier Frequency Division Multiple Access (SC-FDMA) scheme. Details regarding uplink signals are still under investigation.

Regarding channel raster, the channel raster is assumed to be 100 kHz although sparser channel raster cannot be precluded as it is still under discussion in the standardization body.

Current LTE solutions either operate at a sampling rate that may undesirably increase the financial and/or power costs of the corresponding devices, or operate at a cost-efficient sampling rate that undesirably degrades performance. Reducing that sampling rate, however, may negatively impact uplink transmission timing. Therefore, there remains a need for improved processing and timing solutions, particularly for NB-IoT devices.

SUMMARY

The solution presented herein adjusts the uplink transmission timing to conform with existing rules even in the presence of reduced sampling rates that are less than a previously defined "minimum" sampling rate, e.g., at a reduced sampling rate less than that at which an inter-symbol distance can be represented by an integer number of samples. To that end, the solution presented herein determines an adjusted reference timing used for transmission of uplink symbols responsive to a timing discrepancy determined between a previous reference timing and a current reference timing. The solution presented herein adjusts an uplink transmission timing for Orthogonal Frequency Division Multiplex (OFDM) symbols, single-tone symbols, and/or multi-tone symbols.

One exemplary embodiment comprises a method of transmitting first symbols via a transceiver comprising a receiver and a transmitter. The method comprises determining a timing discrepancy between a previous reference timing and a current reference timing. The current reference timing is established responsive to a reduced sampling rate used to process second symbols received by the receiver, where the reduced sampling rate is less than a minimum sampling rate at which an inter-symbol distance between the second symbols can be represented by an integer number of samples. The method further comprises adjusting the current reference timing responsive to the timing discrepancy to generate an adjusted reference timing, and determining an uplink transmission timing responsive to the adjusted reference timing. The method further comprises transmitting the first symbols via the transmitter according to the determined uplink transmission timing.

Another exemplary embodiment comprises a transceiver comprising a transmitter and a receiver, where the transmitter is configured to transmit first symbols. The transceiver further comprises a timing discrepancy circuit, a timing adjustment circuit, and a timing advance circuit. The timing discrepancy circuit is configured to determine a timing discrepancy between a previous reference timing and a current reference timing. The current reference timing is established responsive to a reduced sampling rate used to process second symbols received by the receiver, where the reduced sampling rate is less than a minimum sampling rate at which an inter-symbol distance between the second symbols can be represented by an integer number of samples. The timing adjustment circuit is configured to adjust the current reference timing responsive to the timing discrepancy to generate an adjusted reference timing. The timing advance circuit is configured to determine an uplink transmission timing responsive to the adjusted reference timing. The transmitter is configured to transmit the first symbols according to the determined uplink transmission timing.

Another exemplary embodiment comprises a computer program product stored in a non-transitory computer readable medium for controlling the transmission of first symbols. The computer program product comprises software instructions which, when run on a processing circuit, causes the processing circuit to determine a timing discrepancy between a previous reference timing and a current reference timing. The current reference timing is established responsive to a reduced sampling rate used to process second symbols received by the receiver, where the reduced sampling rate is less than a minimum sampling rate at which an inter-symbol distance between the second symbols can be represented by an integer number of samples. The software instructions further cause the processing circuit to adjust the current reference timing responsive to the timing discrepancy to generate an adjusted reference timing, determine an uplink transmission timing responsive to the adjusted reference timing, and transmit the first symbols according to the determined uplink transmission timing.

Another exemplary embodiment comprises a transceiver apparatus comprising a transmitter apparatus and a receiver apparatus, where the transmitter apparatus is configured to transmit first symbols. The transceiver apparatus further comprises a timing discrepancy module, a timing adjustment module, and a timing advance module. The timing discrepancy module is configured to determine a timing discrepancy between a previous reference timing and a current reference timing. The current reference timing is established responsive to a reduced sampling rate used to process second symbols received by the receiver, where the reduced sampling rate is less than a minimum sampling rate at which an inter-symbol distance between the second symbols can be represented by an integer number of samples. The timing adjustment module is configured to adjust the current reference timing responsive to the timing discrepancy to generate an adjusted reference timing. The timing advance module is configured to determine an uplink transmission timing responsive to the adjusted reference timing. The transmitter apparatus is configured to transmit the first symbols according to the determined uplink transmission timing.

In some embodiments, the timing discrepancy circuit and/or the timing adjustment circuit are implemented by a cell tracker circuit, e.g., such as used to detect and/or track neighbor cells. In other embodiments, the timing discrepancy circuit and/or the timing adjustment circuit are implemented by a channel analyzer circuit, e.g., such as used to analyze a channel between the transceiver (or transceiver apparatus) and a serving cell. In some embodiments, the timing adjustment circuit is implemented by a timing advance handler included as part of the baseband processing circuitry of the transceiver (or transceiver apparatus).

BRIEF DESCRIPTION OF THE DRAWINGS

FIG. 7 shows exemplary coarse and fine timing grids.

FIG. 8 shows exemplary OFDM symbol positions for NCP and ECP.

DETAILED DESCRIPTION

For cost and power savings, it is desirable to design the wireless communication device supporting narrow band (NB) operations, e.g., NB-IoT, to operate using as low a sampling rate as possible. The sampling rate for the smallest LTE cell bandwidth is typically 1.92 mega samples per second (MS/s), for which the normal cyclic prefix (NCP) becomes 10 samples for the first OFDM symbol in a slot and 9 samples in the remaining OFDM symbols. Because there is no common divisor other than 1 for 10 and 9, it means that when sampling the NB-IoT cell with a reduced sampling rate, e.g., lower than 1.92 MS/s, the inter-symbol distance can no longer be represented by an integer number of samples.

Thus one or both of the cyclic prefix lengths will become a rational non-integer number of samples.

One consequence of this reduced sampling rate is that the time resolution becomes coarser. For example, if the reduced sampling rate is 240 kS/s, the downlink time resolution becomes 8 times coarser. While this coarser time resolution can be handled by the NB-IoT device for processing, e.g., demodulation and channel estimation, of downlink signals, it will cause sudden and abrupt changes in the uplink transmission timing when the NB-IoT device modifies its perceived downlink timing by one sample. For the exemplary 240 kS/s, the abrupt change mounts to ±128$T_s$ (±4.2 µs), or almost a complete cyclic prefix, where $T_s$ represents the fundamental time unit used in LTE, and is defined as 1/(2048·15000) seconds. Such an abrupt change would lead to increased inter-symbol interference (ISI) in the network node receiver during the time at which the uplink transmission timing is adjusted to follow the changed downlink timing, and hence would degrade the system performance.

The solution presented herein allows a wireless device, e.g., the NB-IoT device, to operate at a reduced sampling rate, e.g., 240 kS/s (128 $T_s$), while maintaining a fine granularity in the downlink timing, e.g., 16 $T_s$. The solution concerns a frequency domain-based time tracking method for a wireless device, e.g., an NB-IoT device, operating on prior known signals, e.g., synchronization signals, broadcast channel signals, and/or reference signals, where the resolution is higher than the sample resolution, e.g., 4, 6, or 8 times higher for a 480, 320, and 240 kS/s sampling rate, respectively, than for the 1.92 MS/s sampling rate, whereby despite the lower sampling rate, the same resolution for the uplink transmission timing can be maintained as if 1.92 MS/s had been used. As a result, abrupt changes of the uplink transmission timing larger than for the 1.92 MS/s case can be avoided. In so doing, the solution presented herein facilitates reduced cost and power consumption (e.g., by using the reduced sampling rate) without negatively impacting the uplink performance (e.g., by adjusting the uplink transmission timing).

Figure 1:
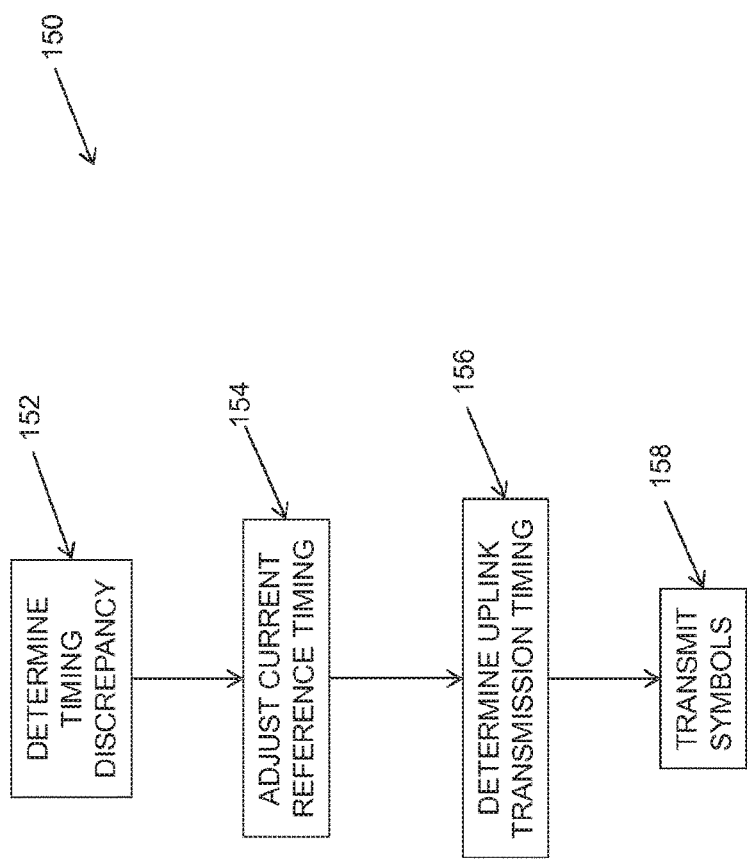
FIG. 1 shows a method for adjusting the uplink transmission timing according to one exemplary embodiment.
Figure 2:
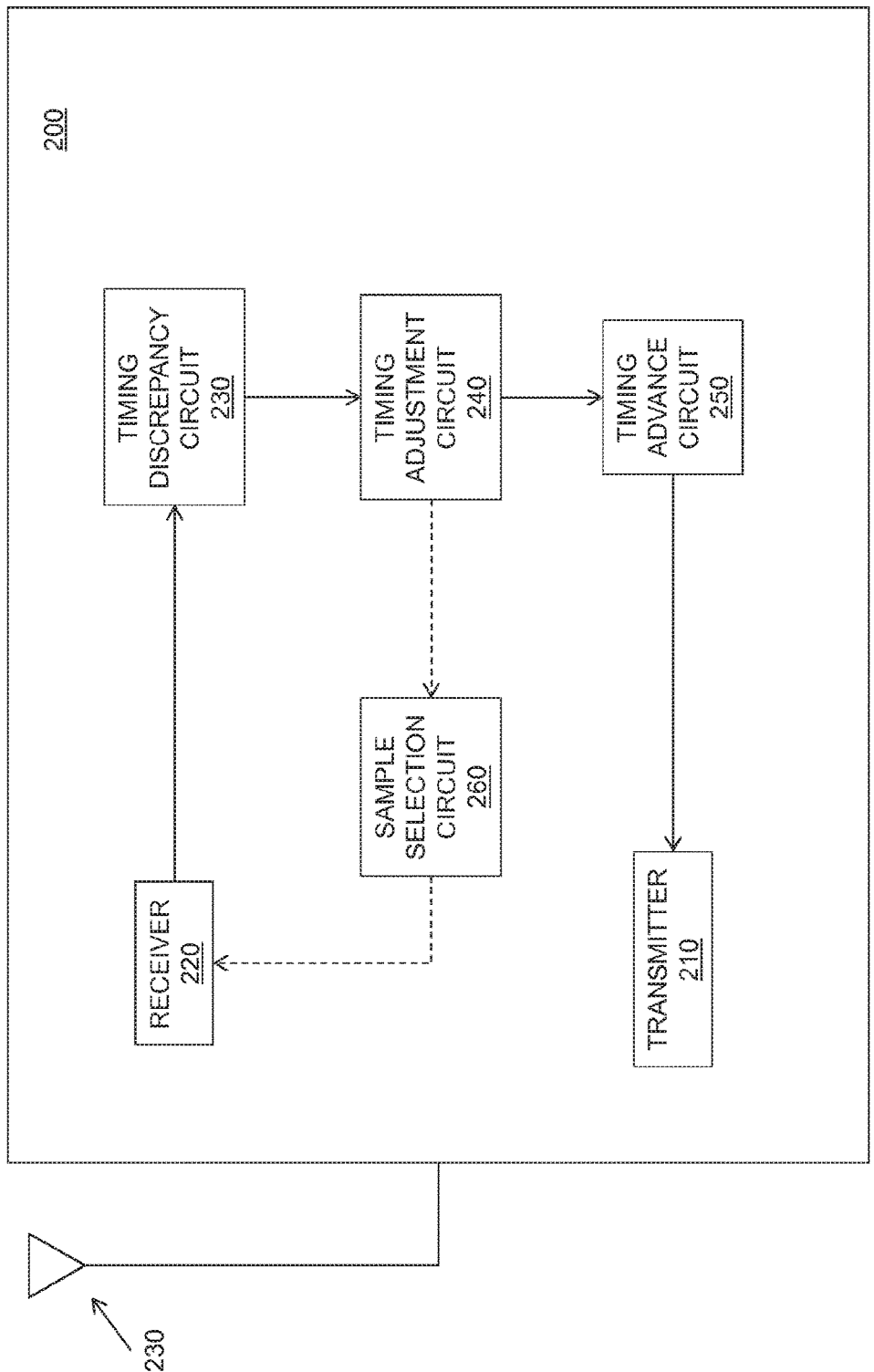
FIG. 2 shows a block diagram of an exemplary transceiver, e.g., an NB-IoT transceiver.

FIG. 1 shows one exemplary method 150 for processing signals received by such a narrow-band wireless communication device, e.g., the wireless communication device 200 of FIG. 2. The following generally describes the embodiments referring to both FIGS. 1 and 2. In some embodiments, the device may include, but is not limited to, a tablet, personal computer, mobile telephone, set-top box, sensor, and camera.

Wireless communication device 200 includes a transmitter 210 and receiver 220 that wirelessly communicate with remote devices/networks via an antenna 230 according to NB operations, e.g., NB-IoT operations. Transmitter 210 generates radio frequency (RF) signals according to any appropriate wireless communication procedures and/or standards, and conveys those RF signals to the antenna 230 for transmission to a remote device, network node, etc. Receiver 220 receives wireless signals from antenna 230, e.g., NB-IoT signals, and processes them according to the appropriate communication procedures and/or standards.

According to the solution presented herein, device 200 adjusts the uplink transmission timing used to transmit uplink symbols via the transmitter 210, where the uplink transmission timing is adjusted relative to a reduced sampling rate used for processing received downlink symbols. The reduced sampling rate (e.g., 240 kS/s) is less than a minimum sampling rate (e.g., 1.92 MS/s), where the minimum sampling rate is the lowest sampling rate at which an inter-symbol distance can be represented by an integer number of samples. To that end, the device 200 executes method 150 of FIG. 1. The device 200 determines a timing discrepancy between a previous reference timing and a current reference timing, where the current reference timing is established responsive to the reduced sampling rate (block 152). The device 200 adjusts the current reference timing responsive to the timing discrepancy to generate an adjusted reference timing (block 154), and determines an uplink transmission timing responsive to the adjusted reference timing (block 156). The device 200 then transmits the uplink symbols via the transmitter 210 according to the determined uplink transmission timing (block 158).

It will be appreciated that in some embodiments the uplink symbols and/or downlink symbols may comprise OFDM symbols. Further, in some embodiments the uplink and/or downlink symbols may comprise single-tone symbols or multi-tone symbols.

To implement the method 150 of FIG. 1, device 200 may comprise a timing discrepancy circuit 230, timing adjustment circuit 240, and timing advance circuit 250. The timing discrepancy circuit 230 determines the timing discrepancy between the previous reference timing and the current reference timing, where the current reference timing is established responsive to the reduced sampling rate. The timing adjustment circuit 240 adjusts the current reference timing responsive to the timing discrepancy to generate the adjusted reference timing. For example, the timing adjustment circuit 240 may determine a fine reference timing having a first resolution responsive to the timing discrepancy, where the fine reference timing corresponds to the minimum sampling rate, e.g., 1.92 MS/s. The timing adjustment circuit 240 may further determine a coarse reference timing having a second time resolution responsive to the timing discrepancy, where the second time resolution is less than the first time resolution and where the coarse reference timing corresponds to the reduced sampling rate. It will be appreciated that the ratio of the first time resolution to the second time resolution produces the same integer as the ratio of the minimum sampling rate to the reduced sampling rate. The timing advance circuit 250 determines the uplink transmission timing responsive to the adjusted reference timing.

Using this determined uplink transmission timing, the transmitter 210 transmits the uplink symbols.

In some embodiments, device 200 may also optionally include a sample selection circuit 260. In this embodiment, the sample selection circuit 260 is configured to adjust the receiver 220 responsive to the determined fine reference timing to select a sample output by the receiver 220 based on the determined fine reference timing.

Figure 3:
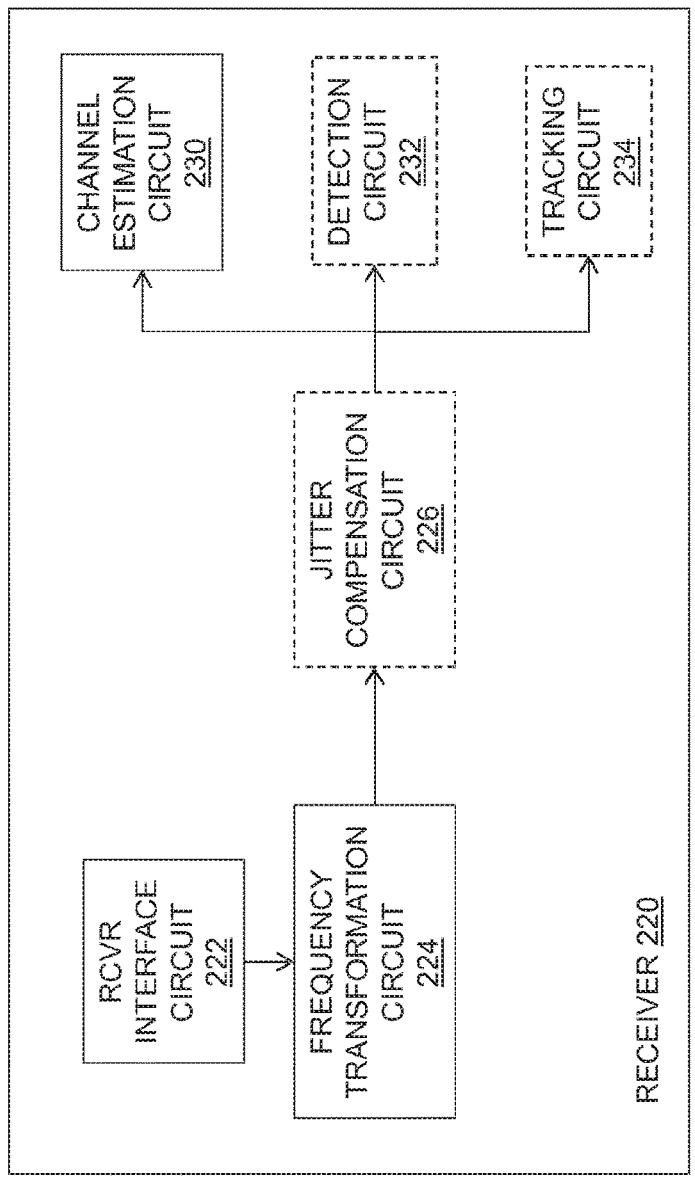
FIG. 3 shows a block diagram of an exemplary receiver for the transceiver of FIG. 2.

In some embodiments, as shown in FIG. 3, receiver 220 may comprise a receiver interface circuit 222, frequency transformation circuit 224, and a channel estimation circuit 230. For each of the received OFDM symbols, the receiver interface circuit 222 receives a plurality of radio samples produced by a sampling of an OFDM symbol (e.g., one of the received OFDM symbols) at the reduced sampling rate, where the reduced sampling rate causes the inter-symbol jitter between the OFDM symbols. In one embodiment, the radio samples are produced by an equidistant sampling of the OFDM symbol. The frequency transformation circuit 224 transforms the samples of the OFDM symbol into a plurality of frequency-domain resource elements. For example, the frequency transformation circuit 224 may comprise a Fast Fourier Transform (FFT) circuit, e.g., a 16 point FFT circuit. The channel estimation circuit 230 determines channel estimates for each subcarrier using the corresponding plurality of frequency-domain resource elements containing known information, e.g., reference signals, synchronization signals, and/or broadcast channel signals. In this case, the timing discrepancy circuit 230 may determine the timing discrepancy by averaging the channel estimates per subcarrier to determine average channel estimates per subcarrier, and determine the timing discrepancy using the average channel estimates. For example, the timing discrepancy circuit 230 may determine a phase relationship between the average channel estimates per subcarrier, and determine the timing discrepancy using the phase relationship per subcarrier.

Receiver 220 may also include an optional jitter compensation circuit 226, where the jitter compensation circuit 226 may be used to address the jitter introduced by the reduced sampling rate. In this embodiment, the jitter compensation circuit 226 determines a sample offset corresponding to a symbol number for the OFDM symbol, and determines a phase offset for each of the resource elements using the sample offset. In some embodiments, the jitter compensation circuit 226 may determine the phase offset using the sample offset and a frequency of the corresponding resource element. The jitter compensation circuit 226 then reduces the inter-symbol jitter by rotating each resource element using the corresponding phase offset to generate phase-rotated resource elements. For example, the jitter compensation circuit 226 may rotate each resource element by a conjugate of the corresponding phase offset. If jitter compensation is implemented, e.g., using the jitter compensation circuit 226, the channel estimation circuit 230 determines the channel estimates using the corresponding phase-rotated resource elements containing known information.

In some embodiments, receiver 220 may also optionally include additional processing circuits that use the phase-rotated resource elements to generate information useful to the receiver for processing data. For example, the receiver 220 may optionally include a detection circuit 232 and/or a tracking circuit 234. Detection circuit 232 uses the phase-rotated resource elements detect one or more neighbor cells. Tracking circuit 234 uses the phase-rotated resource elements to track changes in the timing of a neighbor cell. It will be appreciated that the phase-rotated resource elements used by the channel estimation circuit 230 may be the same as or different from the phase-rotated resource elements used by the detection circuit 232 and/or tracking circuit 234. In some embodiments, the channel estimation circuit 230 may use first resource elements or first phase-rotated resource elements, while the detection circuit 232 and/or tracking circuit 234 may use second phase-rotated resource elements. In this case, the first resource elements or first phase-rotated resource elements are generated for OFDM symbols received from a serving cell and used by the channel estimation circuit 230 to generate channel estimates for the serving cell, while the second phase-rotated resource elements are generated for OFDM symbols received from a neighbor cell and used by the detection circuit 232 and/or tracking circuit 234 to generate information about the neighbor cell.

When different resource elements are generated for different cells, it will be appreciated that the receiver 220 may use the same circuitry in serial to generate the resource elements for the different cells, or the receiver 220 may Include multiple sets of the interface, frequency transformation, and jitter compensation circuitry that operate in parallel to generate the resource elements for the different cells.

Figure 4:
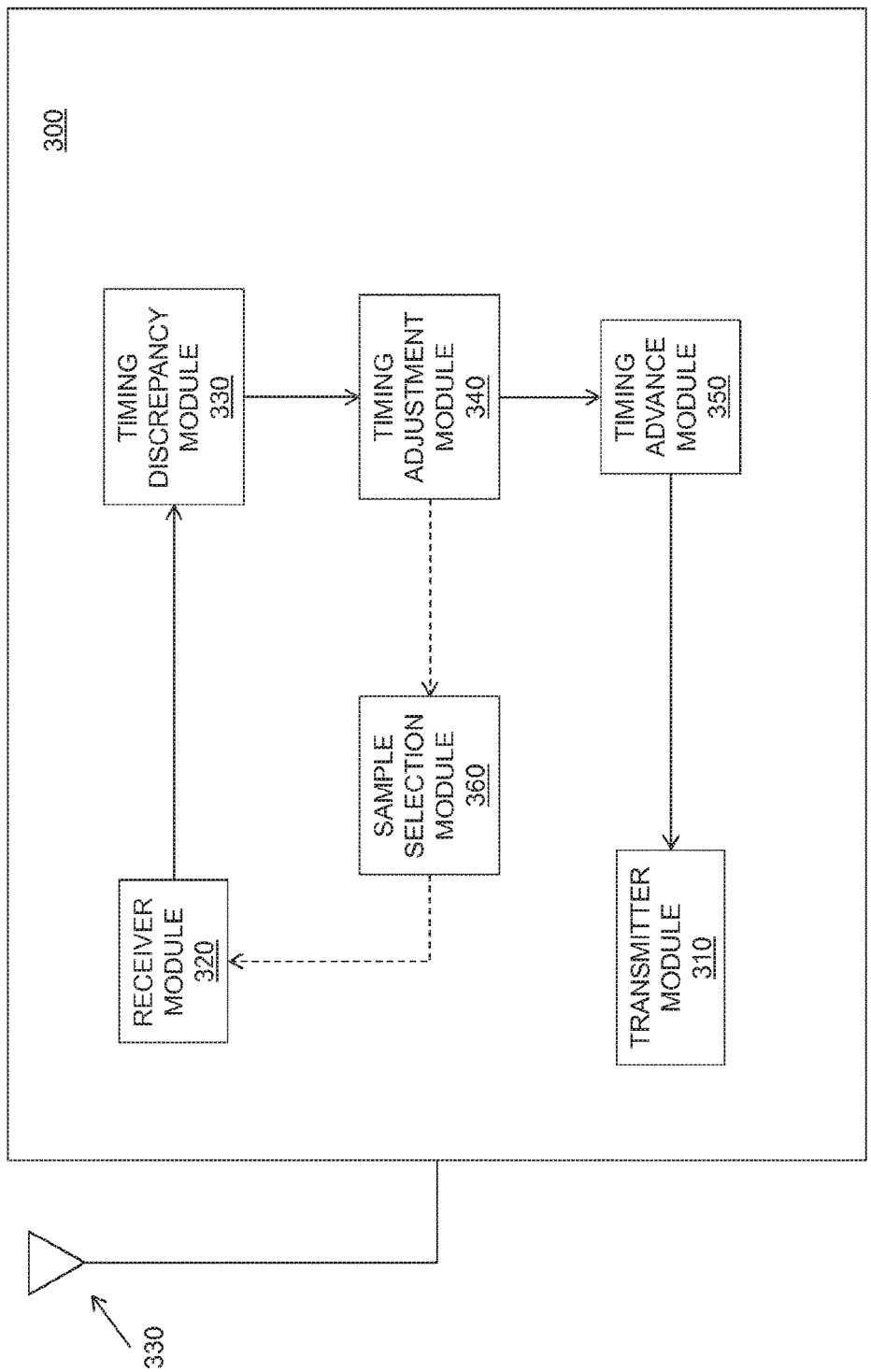
FIG. 4 shows a block diagram of another exemplary transceiver, e.g., a NB-IoT transceiver.
Figure 5:
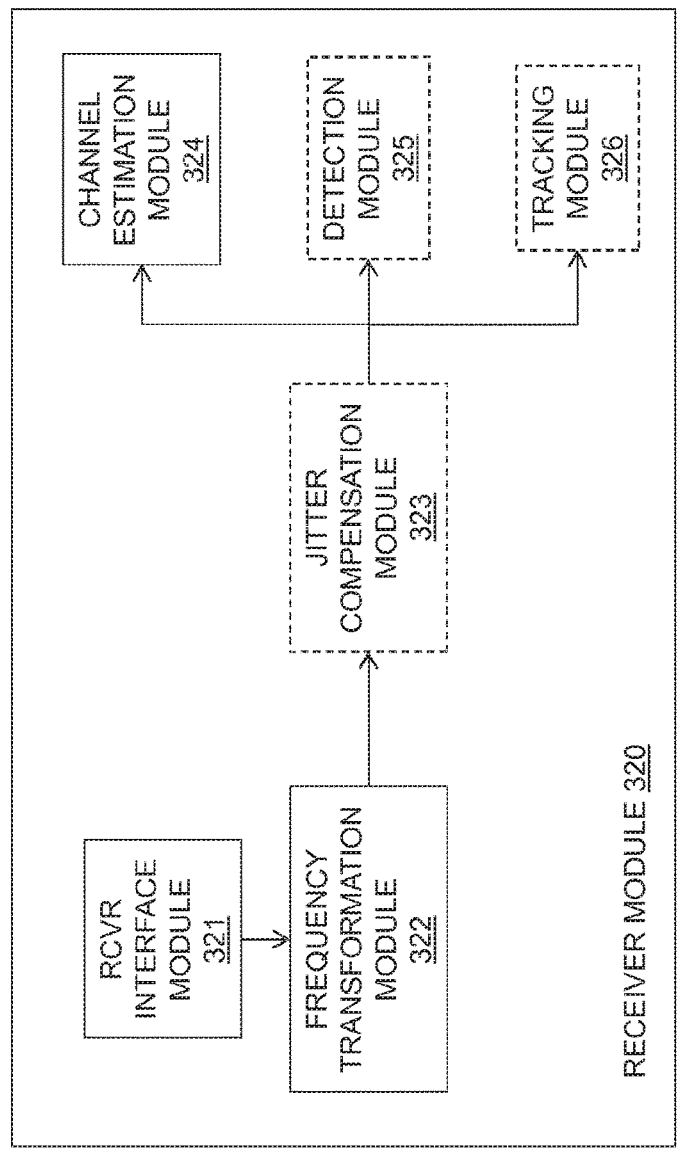
FIG. 5 shows a block diagram of an exemplary receiver for the transceiver of FIG. 4.
Figure 6:
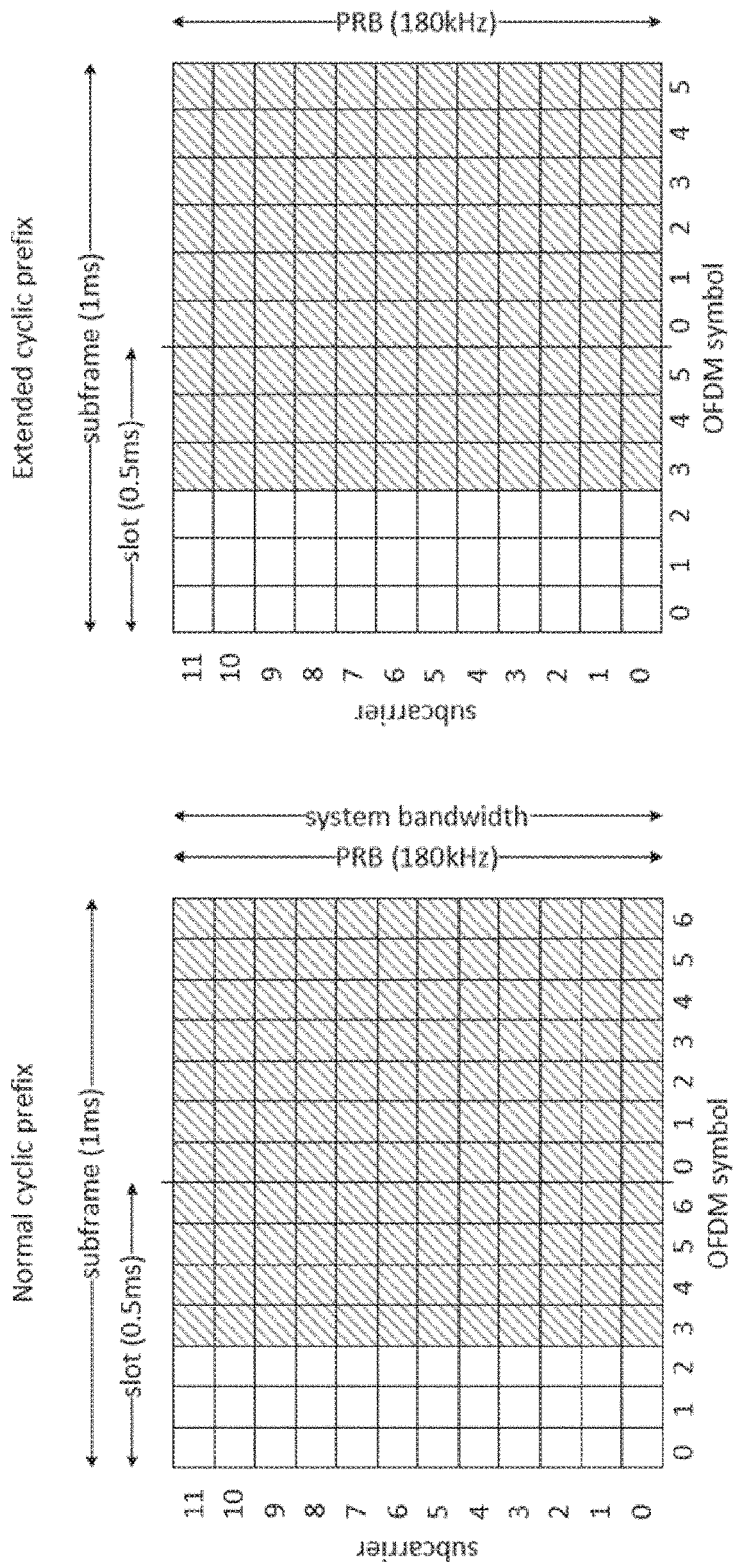
FIG. 6 shows exemplary downlink resource time-frequency grids for NCP and ECP.

It will be appreciated that other devices may implement the method 150 of FIG. 1. For example, the wireless communication apparatus 300 shown in FIG. 4 may comprise the illustrated transmitter module 310, receiver module 320, and antenna 330, where the receiver module 320 may use the Illustrated timing discrepancy module 330, timing adjustment module 340, and timing advance module 350 to adjust the uplink transmission timing. The apparatus may optionally use the sample selection module 360 to select the sample used for downlink signal processing. Further, the receiver module 320 may comprise the receiver interface module 321, frequency transformation module 322, and channel estimation module 324 as shown in FIG. 5, as well as optional jitter compensation module 323 to reduce the inter-symbol jitter between received OFDM symbols. Similarly, the receiver module 320 may include a detection module 325 and/or tracking module 326 to perform the detection and/or tracking operations described herein.

Those of skill in the art will also readily recognize that the method 150 described herein may be implemented as stored computer program instructions for execution by one or more computing devices, e.g., microprocessors, Digital Signal Processors (DSPs), FPGAs, ASICs, or other data processing circuits. The stored program instructions may be stored on machine-readable media, e.g., electrical, magnetic, or optical memory devices. The memory devices may include ROM and/or RAM modules, flash memory, hard disk drives, magnetic disc drives, optical disc drives and other storage media known in the art. For example, method 150 may be implemented using a processing circuit where software instructions run on the processing circuit cause the processing circuit to execute the method 150 of FIG. 1.

Further, the processing circuit may execute software instructions to perform the jitter compensation, channel estimation, detection, and/or tracking functions described herein.

The solution presented herein allows a lower sampling rate, e.g. 240, 320, or 480 kS/s, to be used by the NB-IoT wireless radio device, without sacrificing the uplink transmission timing. This in turn allows a cheaper device to be implemented because using the lower sampling rate requires less memory for buffering and/or a less powerful Digital Signal Processor (DSP) and/or Central Processing Unit (CPU) than if receiving and processing samples acquired at 1.92 MS/s. Further, using the lowered sampling rate also results in lower power consumption The following provides additional details regarding the uplink transmission timing solution presented herein. According to the solution presented herein, device 200 will adjust the transmission timing such that the difference between the transmission timing and the reference timing, defined as the point in time ($N_{TA\_Ref}+N_{TA\_offset}$), before the timing of the first detected downlink path of the reference cell, is within $\pm T_e$. For the smallest LTE cell bandwidth for which a sampling rate of 1.92 MS/s is used, $T_e$ is specified to 24 $T_s$ or 0.8 μs (3GPP TS 36.133 V12.7.0, Section 7.1.2). The parameters $N_{TA\_Ref}$ and $N_{TA\_offset}$ together specify a dynamic timing offset between downlink and uplink that is controlled by the network node via MAC signaling of Timing Advance commands.

When using a lower sampling rate than 1.92 MS/s, e.g., 240 kS/s, the time resolution decreases correspondingly and becomes 8 times coarser, see FIG. 7. In particular, FIG. 7 shows the coarse timing grid with resolution equivalent to the sample length at the reduced sampling rate (e.g., 240 kS/s), and the fine timing grid with resolution equivalent to the sample length at the minimum sampling rate (e.g., 1.92 MS/s). This results in that conventional time tracking methods that are based e.g. on estimation of a power delay profile (PDP) will produce an estimate with resolution 128 $T_s$ instead of 16 $T_s$.

Hence, each change in downlink timing would be in steps of 4.2 μs instead of 0.5 μs.

There are limitations on how fast the uplink timing is allowed to be changed, which for the smallest LTE cell bandwidth for which a 1.92 MS/s rate is used are:

maximum timing adjustment in one correction shall not exceed 17.5 $T_s$, minimum aggregated adjustment rate shall be 7 $T_s$ per second, and maximum aggregated adjustment rate shall be 17.5 $T_s$ per 200 ms.

For a downlink sampling rate of 240 kS/s, an adjustment of the uplink transmission timing of one sample position thus would take 1.5 seconds to fully adjust due to limitation on the maximum adjustment rate. During those 1.5 seconds, the uplink transmission timing will not be optimal, and hence inter-symbol interference may arise on the network node side.

As addressed in the co-pending application titled "NB-IoT Receiver Operating at Minimum Sampling Rate" and filed concurrently with this application, one problem with using 240 kS/s instead of 1.92 MS/s is that the NCP cannot be represented by an integer number of samples. This shifts the start positions relative to the sampling grid to different values for different symbols in a slot, as illustrated in FIG. 8. The symbol start has to be taken within the cyclic prefix, and this leads to—provided that the start of a radio frame is perfectly aligned with the sample grid—that the start positions for the FFT of each OFDM symbol is to be taken as described in Table 1 (when the sampling rate is 240 kS/s). The "NB-IoT Receiver Operating at Minimum Sampling Rate" solution compensates the linear phase component that results from the varying offsets. It is however important that the frame start and the 240 kS/s sample grid are well aligned and this is addressed in the solution presented herein.

TABLE 1

FFT start positions and offset for 240 kS/s

| | | Normal cyclic prefix | | Extended cyclic prefix | |
|---|---|---|---|---|---|
| Symbol | | Symbol start [sample] | Offset [samples] | Symbol start [sample] | Offset [samples] |
| slot 0 | 0 | 1 | −0.25 | 2 | −2 |
| | 1 | 18 | −0.375 | 22 | −2 |
| | 2 | 35 | −0.5 | 42 | −2 |
| | 3 | 52 | −0.625 | 62 | −2 |
| | 4 | 69 | −0.75 | 82 | −2 |
| | 5 | 86 | −0.875 | 102 | −2 |
| | 6 | 103 | −1 | — | — |
| slot 1 | 0 | 121 | −0.25 | 122 | −2 |
| | 1 | 138 | −0.375 | 142 | −2 |
| | 2 | 155 | −0.5 | 162 | −2 |
| | 3 | 172 | −0.625 | 182 | −2 |
| | 4 | 189 | −0.75 | 202 | −2 |
| | 5 | 206 | −0.87 | 222 | −2 |
| | 6 | 223 | −1 | — | — |

Figure 9:
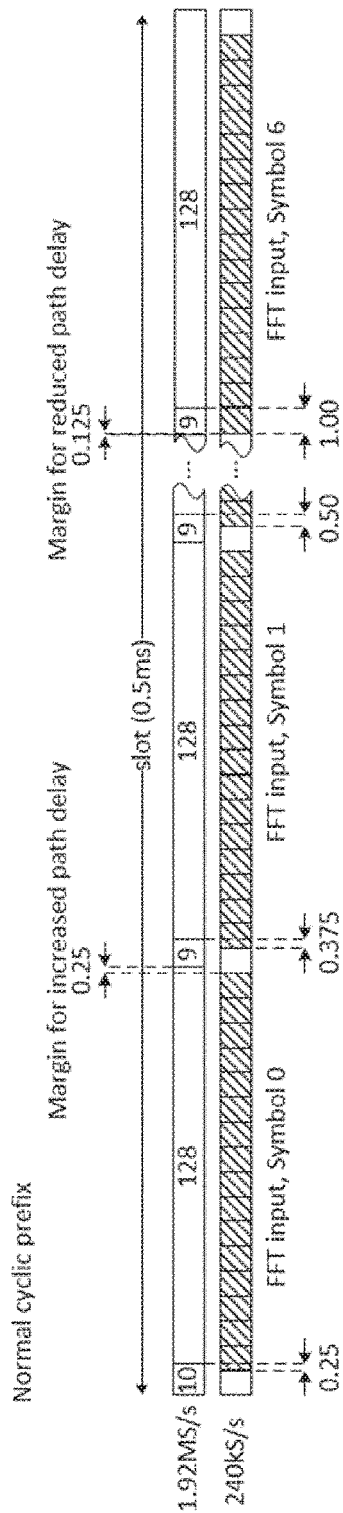
FIG. 9 shows exemplary symbol start offset jitter and margins for path delay for the reduced sampling rate.
Figure 10:
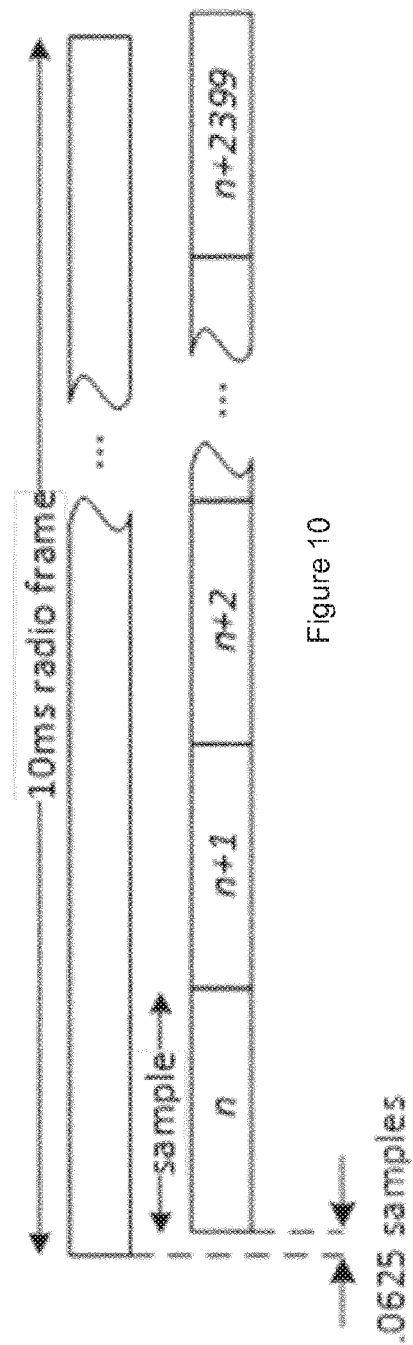
FIG. 10 shows exemplary timing resolution between a sample grid and a radio frame start for the reduced sampling rate with NCP.

As can be noted in Table 1, there is an asymmetry due to the fact that the first OFDM symbol in each slot has a slightly longer Cyclic Prefix (CP). The offset to the actual OFDM symbol start is −0.25 for OFDM symbol 0, and −0.875 for OFDM symbol 6. The margin for a path delay change in one direction thus is 0.25 samples, whereas it is 0.125 samples in the other direction. See, e.g., FIG. 9, which shows the symbols start offset jitter and margins for path delay change expressed for a 240 kS/s sample length. The margin is Important when the path delay changes, and in order to have similar margin for a path delay change in either direction, one can strive for a timing relation where the coarse sample grid is offset by 0.125/2 samples relative to the radio frame start, when a normal cyclic prefix is used by the serving cell. By doing so the margin becomes 0.1875 samples (24 $T_s$) for both increasing and decreasing path delay. FIG. 10 shows an example of the optimum timing relation between the sample grid and the radio frame start for a 240 kS/s sampling rate and a serving cell with an NCP. Such offset is not needed for ECP, where the cyclic prefix length is 4 samples, and whereby jitter is avoided and the margin can be made the same for path delay changes in either direction by taking the symbol start position in the middle of each CP.

Figure 11:
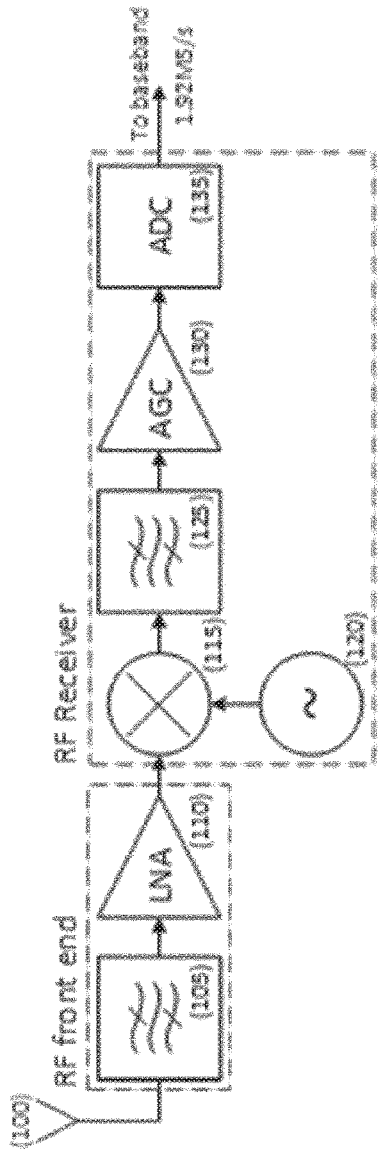
FIG. 11 shows an exemplary receiver circuit.

When the path delay changes, the NB-IoT device 200 modifies the sample grid to maintain as close to 0.0625 samples offset to the received radio frame. This can be achieved, e.g., by controlling which sample phase is kept after the analog-to-digital conversion (ADC) carried out in the RF receiver. To illustrate the principle, consider the legacy RF receiver shown in FIG. 11. In this exemplary receiver, the RF signal is picked up by an antenna 100, passed through an RF filter 105, and amplified by a low-noise amplifier (LNA) 110. The amplified signal is passed through a mixer 115, which mixes the signal down to baseband, and which is controlled by a local oscillator 120. The baseband signal is passed through a filter 125 that suppresses modulation products other than the baseband signal. The filtered baseband signal is passed through an amplifier 130, e.g., an automatic gain control (AGC) amplifier, that adjusts the amplitude of the signal to be within a suitable range for the analog-to-digital conversion carried out by the ADC 135. In this example, the output from the RF receiver is a stream of IQ samples at 1.92 MS/s.

Figure 12:
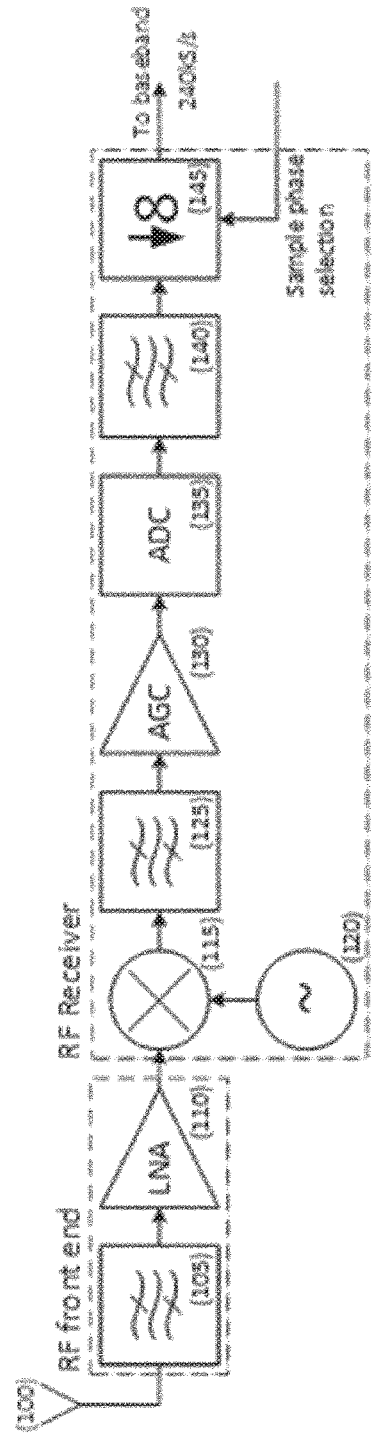
FIG. 12 shows an exemplary receiver circuit according to one exemplary embodiment.
Figure 13:
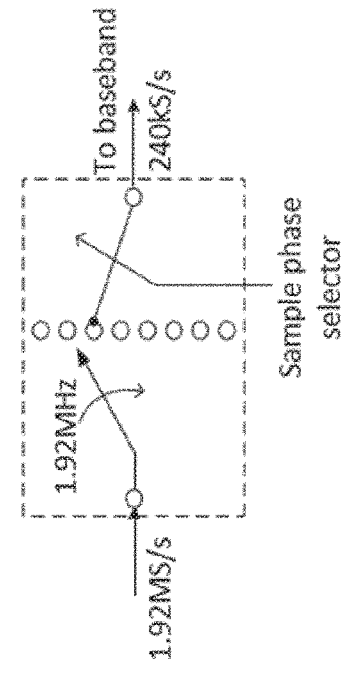
FIG. 13 shows an exemplary decimation circuit for the receiver circuit of FIG. 12.

According to the solution presented herein, there is an additional down-sampling of the signal to 240 kS/s. This may, e.g., be carried out directly by the ADC (e.g., if using a sigma-delta (JA) converter), or as shown in FIG. 12, by adding a low-pass filter 140 and a decimator (145) that can be controlled from the baseband to keep a particular sample phase to the receiver of FIG. 11, e.g., in response to a signal from the sample selection circuit 260. FIG. 13 shows an exemplary decimator, which essentially discards seven samples for each sample it keeps from the ADC output A sample phase selector signal, e.g., such as provided by the sample selection circuit 260, may be used to control which of the eight samples is kept.

Figure 14:
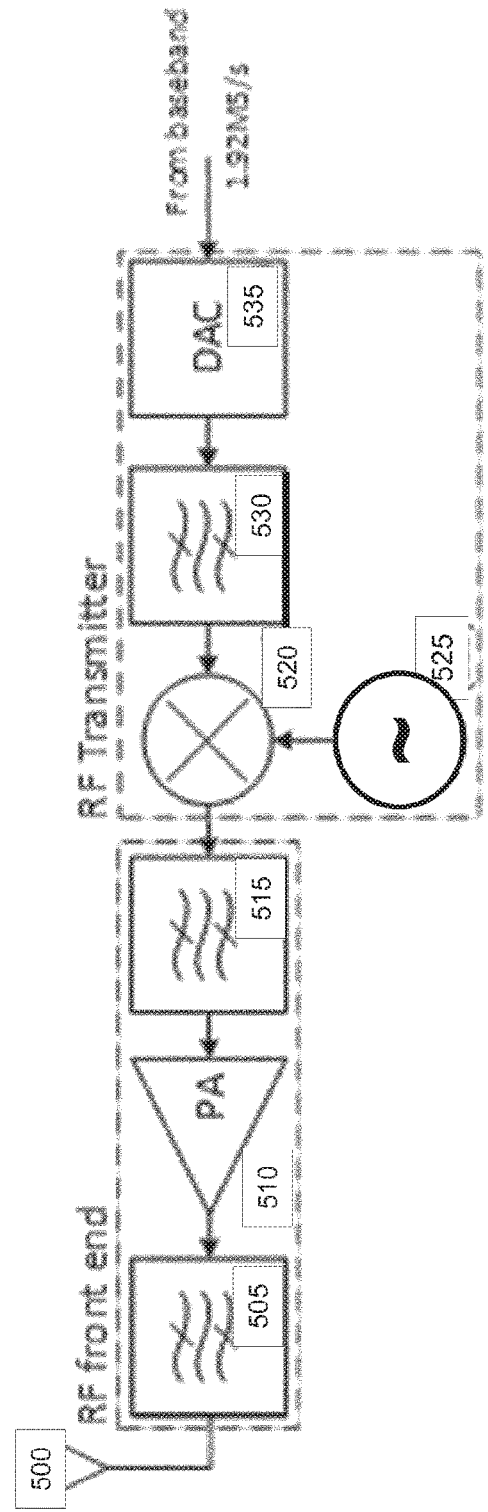
FIG. 14 shows an exemplary transmitter circuit.

FIG. 14 shows an exemplary RF transmitter circuit, e.g., transmitter circuit 210. The baseband signal is provided to the transmitter at a data rate of 1.92 MS/s in order to maintain a resolution of 16 $T_s$ for the uplink transmission timing. The baseband signal is input to a digital-to-analog converter (DAC) 535, passed through a filter 530, upconverted by a mixer 520 to translate it from baseband to RF. The mixer 520 is controlled by a local oscillator 525. The RF signal is passed through a filter 515 that suppresses unwanted modulation products, and through a power amplifier (PA) 510. Thereafter, the amplified signal is passed through a filter 505 that shapes the spectrum of the signal, e.g., to prevent leakage to adjacent channels, before it is sent on to antenna 500 for transmission.

Figure 15:
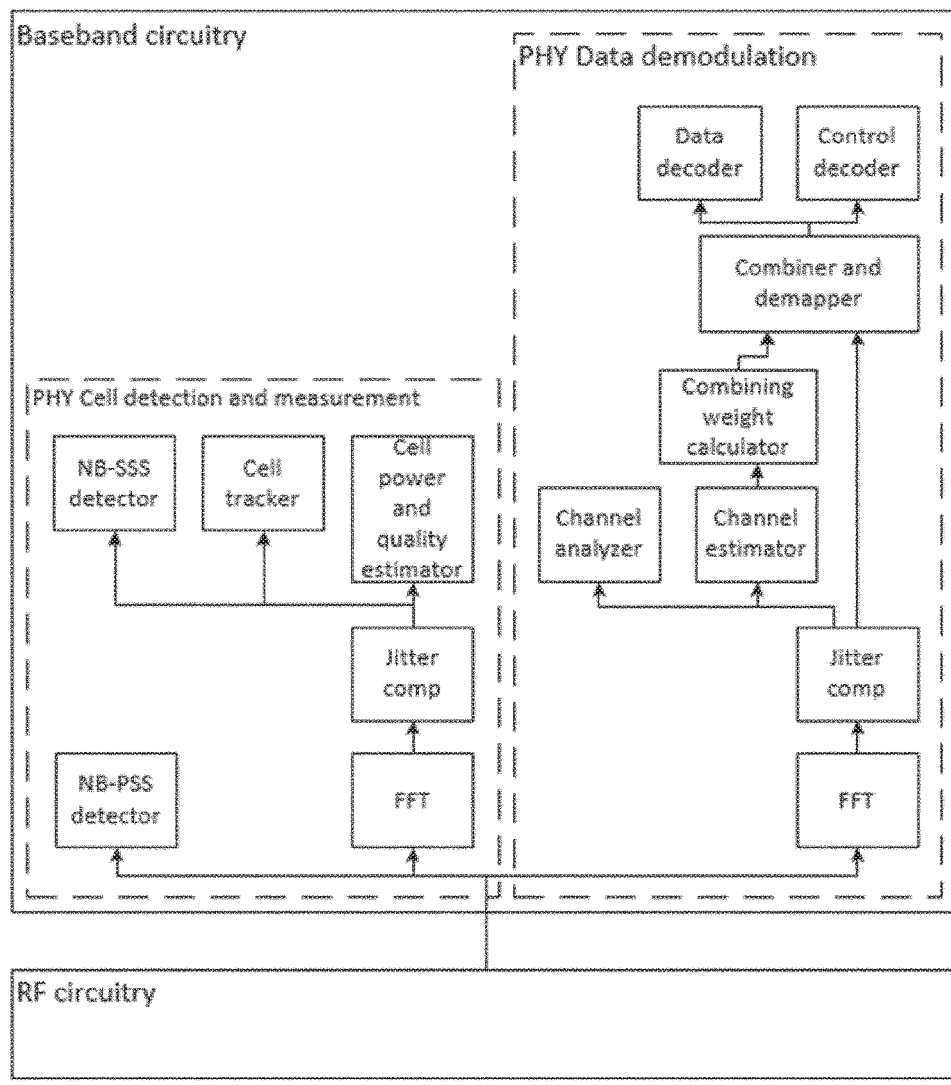
FIG. 15 shows a block diagram of an exemplary NB-IoT physical layer architecture.

FIG. 15 shows an exemplary NB-IoT physical layer architecture for the relevant downlink parts. The RF circuitry delivers samples at e.g., 240 kS/s to the baseband circuitry. The samples are used for data demodulation (common control, dedicated control, broadcasts, unicast and multicast data) by the PHY Data demodulation unit. Each time domain OFDM symbol that is to be demodulated is subjected to an FFT (16 point in case of 240 kS/s), and the twelve outputs that correspond to REs are fed to a Jitter compensation circuit (e.g., jitter compensation circuit 226) that compensates for the symbol start jitter. Thereafter, the REs are fed to the Channel estimator (e.g., channel estimation circuit 230), Channel analyzer, and the Combiner and demapper. The Channel estimator estimates the propagation channel using prior known signals such as pilots/reference symbols (that may be common or dedicated), broadcast channel signals, and/or synchronization signals. In case two TX ports are used by the network node there are two radio paths to the single RX antenna used by the NB-IoT device. The Combining weight calculator takes the channel estimates and determines the optimum way of combining the data received over two radio paths. It provides combining weights to the Combiner and demapper, which uses the weights when combining the data. The Combiner and demapper converts the combined modulation symbols carried by the REs into softbits, which then are fed to the Data decoder or the Control decoder for decoding.

The same samples that are received from the RF circuitry may also be used for detection of new intra-frequency neighbor cells, and for tracking and measurements of detected neighbor cells. The primary synchronization signal detection is carried out in the time domain by the NB-PSS detector. Once an NB-PSS has been detected, the identity of the detected cell is determined by detecting the associated NB-SSS which uniquely provides the physical layer identity of the cell. NB-SSS operates in the frequency domain and hence on the output of the FFT and Jitter compensator.

The signal strength and signal quality of detected neighbor cells are measured by the Cell power and quality estimator in order to determine whether any of the neighbor cells would be more suitable as serving cell. The measurements are carried out on known signals, e.g., pilots/reference symbols (that may be common or dedicated) and/or synchronization signals and/or broadcast channel signals, in the frequency domain.

The frame timings of serving cell and neighbor cells are tracked by the Cell tracker (e.g., tracking circuit 234). The baseband part of the solution presented herein, e.g., the timing discrepancy circuit 230 and timing adjustment circuit 232, may be implemented in the cell tracker (e.g., the tracking circuit 234), and used when the serving cell is tracked. In certain implementations, the timing discrepancy circuit 230 and timing adjustment circuit 232 may be handled by the Channel analyzer instead.

Figure 16:
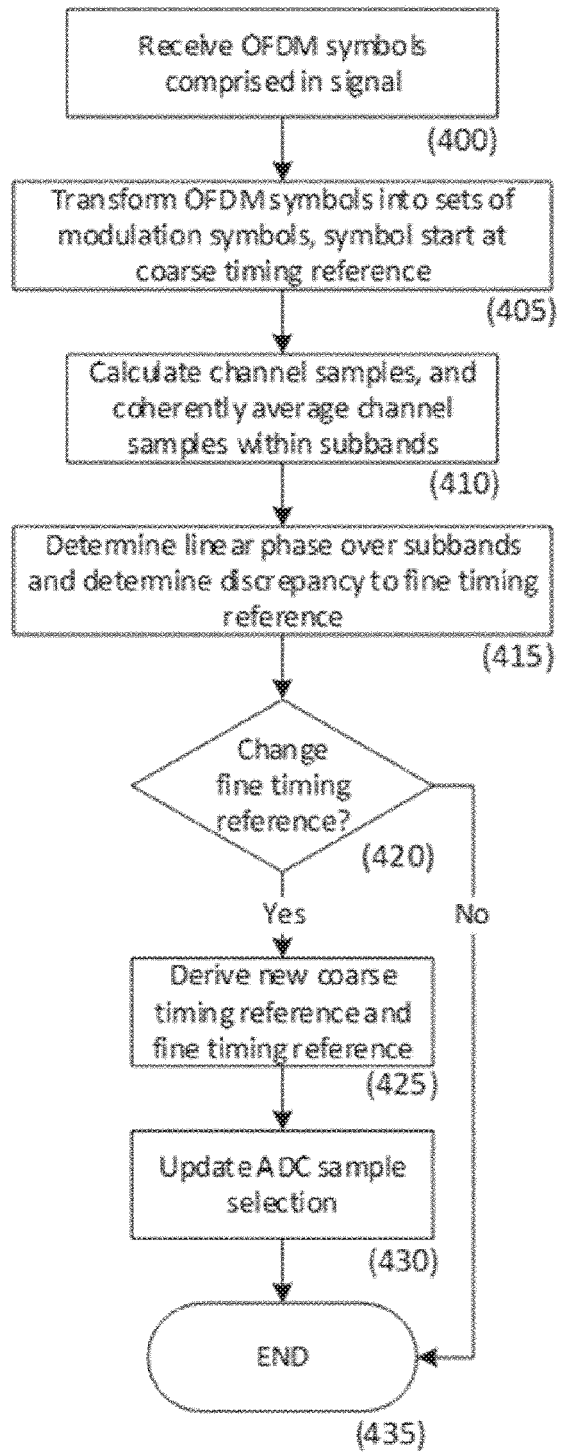
FIG. 16 shows a method for adjusting the uplink transmission timing according to one exemplary embodiment.

FIG. 16 shows an exemplary flowchart for the solution presented herein. The time-domain OFDM symbols carrying the signal, e.g., NB-SSS, are extracted from the sample stream (block 400) and transformed to REs by FFT with a symbol start taken in the cyclic prefix (block 405) according to the coarse timing reference. Block 405 may make use of the jitter compensation solution of the co-pending application discussed above, in order to equalize the phase jitter that arises due to the different OFDM symbol offsets for NCP as described in Table 1. Channel samples are calculated by multiplying the conjugated modulation symbols of the known signal with the corresponding REs in the received signal. Thereafter, the channel samples are averaged per subcarrier over the time domain (block 410). For ease of presentation, the averaged channel samples are denoted by $X_R$, where $k \in \{0, 1, \ldots, 11\}$ represents the subcarrier number. The slope of the phase is determined by, e.g., maximizing the magnitude of the weighted sum of averaged channel estimates under a set of hypotheses on discrepancy between the assumed path delay and the actual path delay (block 415). For example, the timing discrepancy may be determined by determining a value for $\gamma$ that maximizes:

$$P(\gamma) = \left| \sum_{\forall k} X_k \theta(k, \gamma) e^{j\frac{2\pi \rho k}{N}} \right|^2, \quad (1)$$

where $\gamma$ represents a fractional coarse sample offset, $X_k$ represents the average channel estimates for the $k^{th}$ subcarrier, $\rho$ represents an offset between a radio frame start and a coarse sampling grid corresponding to the reduced sampling rate (e.g., as shown in FIG. 10), and N represents a size of a frequency transform circuit it the receiver. Further, in Equation (1)

$$\theta(k, \gamma) = e^{-j\frac{2\pi \gamma k}{N}}, \quad (2)$$

where $\theta(k,\gamma)$ represents the phase rotation of the $k^{th}$ subcarrier that is caused by the fractional coarse sample offset $\gamma$. The parameter $\gamma$ represents the fractional coarse sample offset (e.g. $\ldots, -\frac{3}{8}, -\frac{2}{8}, -\frac{1}{8}, 0, \frac{1}{8}, \frac{2}{8}, \frac{3}{8} \ldots$), where $\frac{1}{8}$ sample corresponds to the resolution of the fine timing grid. Here the FFT size N=16 is assumed. The value of p is $\frac{1}{16}$ for NCP and 0 for ECP. In case it is determined that there is a timing discrepancy between the assumed path delay (previous path delay) and the actual path delay (current path delay), manifested by any other value of $\gamma$ than 0 maximizing $P(\gamma)$(block 420: YES), new coarse and fine timings are derived (block 425).

Concretely, assuming there is an internal modem reference clock to which the assumed radio frames start position can be expressed as $m=16T_s$, and the timing discrepancy between the assumed (previous) and the actual (current) path delay was determined to be $q \cdot 16T_s$, the coarse sample timing defining the start position of the radio frame is calculated as:

$$\left\lfloor \frac{m+q}{8} \right\rfloor, \quad (3)$$

where $\lfloor \ \rfloor$ represents a floor operation, and the fractional coarse sample position, which is to be handled by selecting an appropriate sample phase, is calculated as $\mathrm{mod}_8 (m+q)$.

After having determined the coarse sample position and the residual, the NB-IoT device reconfigures the Decimator and sample selector to select the sample phase associated with $\mathrm{mod}_8 (m+q)$ (block 430).

Figure 17:
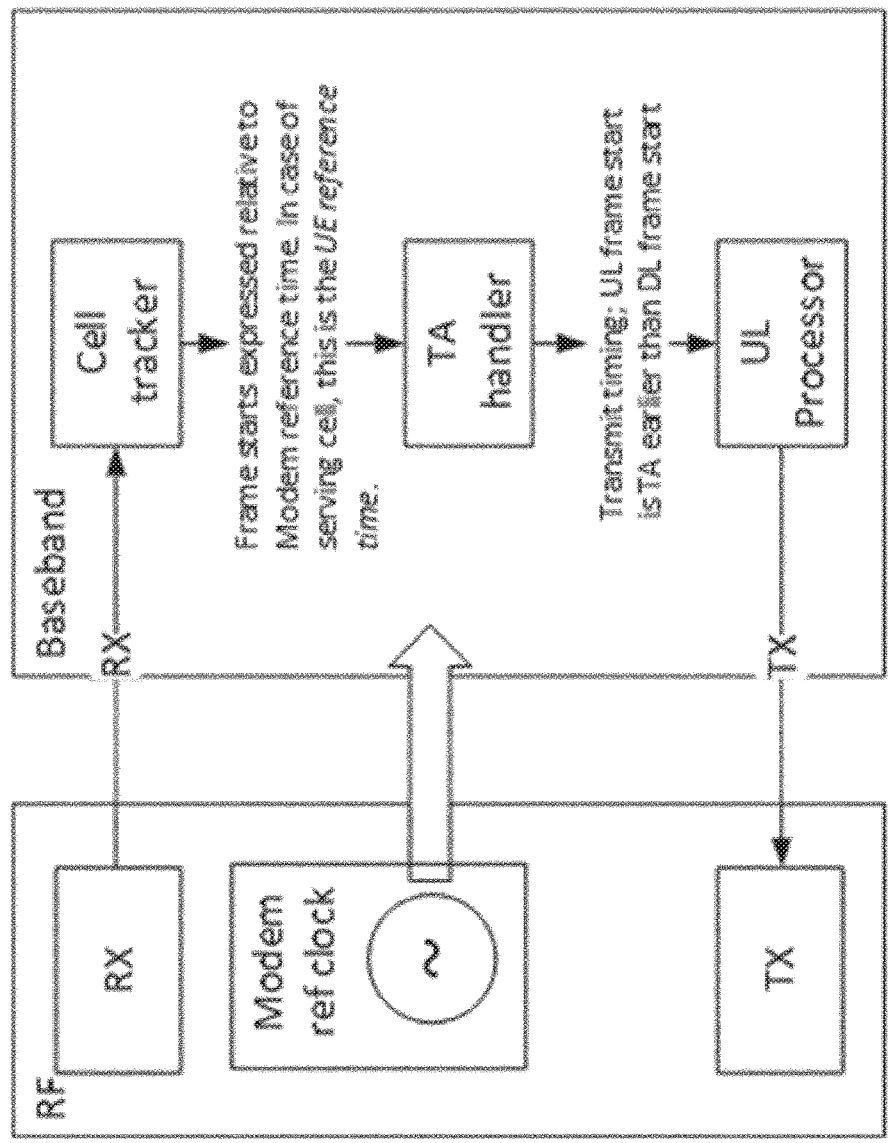
FIG. 17 shows a block diagram for an exemplary transceiver according to one exemplary embodiment.
Figure 18:
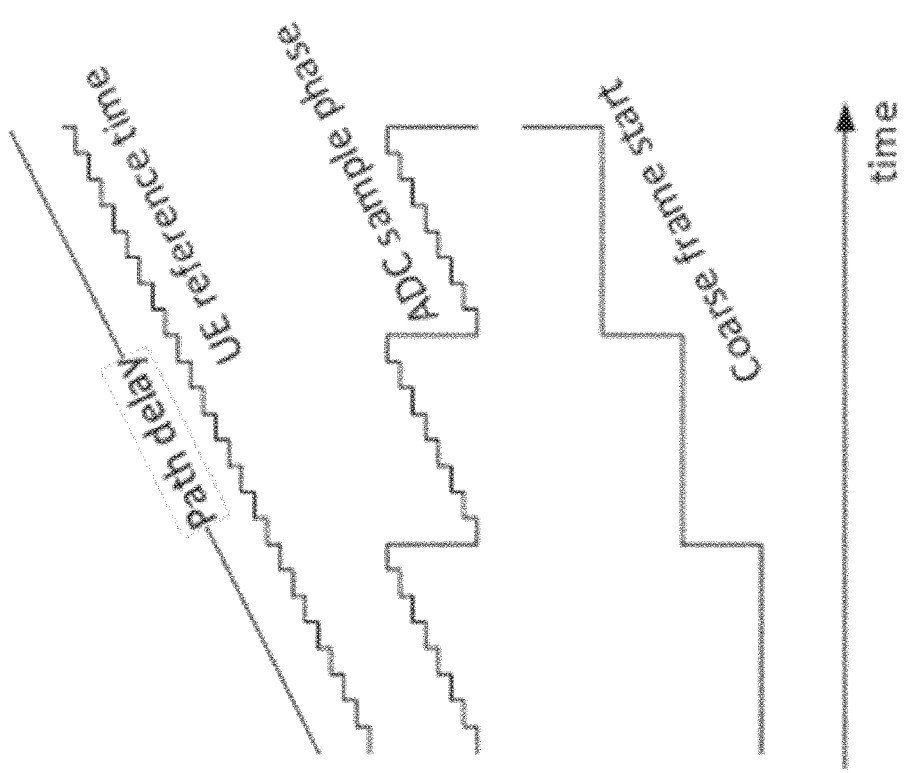
FIG. 18 shows cell timing drift, and the impact of such on reference timing, sample phase, and coarse frame start.

FIGS. 17 and 18 show exemplary timing relationships between the modem reference timing, the NB-IoT reference timing, and the uplink transmission timing. The modem reference timing is provided by an oscillator that normally is comprised in the RF circuitry.

The modem reference timing is distributed to the whole baseband, and is used as a reference to which, e.g., frame starts in cells are related. The Cell tracker in the baseband circuitry tracks the frame start of the serving cell using the received radio samples. In some embodiments, the timing discrepancy circuit 230 and the timing adjustment circuit 240 are comprised in the cell tracker. The cell tracker provides information on the frame start, expressed in modem time, to the Timing Advance (TA) handler (e.g., timing advance circuit 250). The TA handler provides the uplink frame start to the Uplink (UL) Processor. The uplink frame start dictates when to transmit (uplink transmission timing), is expressed in modem time, and expresses a point in time that is earlier than the corresponding downlink frame start How much earlier is determined by the timing advance provided by the network node, and by the rules that limit how quickly a change in downlink frame timing can be propagated to the uplink frame timing (see above).

FIG. 18 shows an example where, e.g., due to movement of the NB-IoT device, the path delay of the serving cell increases. The NB-IoT device tracks this change and continuously, using the solution presented herein, updates the reference timing with a granularity of 16 $T_s$, although each sample received by the baseband has a length of 128 $T_s$. In order to reduce inter-symbol interference (ISI), the NB-IoT device matches every change of 16 $T_s$ by changing the ADC sample phase. This allows the NB-IoT device to extract OFDM symbols using a first sample that contains at least a part of the cyclic prefix (see FIG. 9). When the ADC sample phase has been increased eight times, it is reset to zero, and the coarse frame start, representing whole samples at the coarse resolution, is incremented.

A method according to one exemplary embodiment is Implemented in a wireless communication device for downlink path delay tracking of a radio signal that has been transmitted using a first time resolution, and where the baseband signal received by the wireless communication device is represented using a second time resolution which is lower than the first time resolution. The method comprises receiving a set of time-domain OFDM symbols carrying at least one prior known signal, and representing the time-domain OFDM symbols using the second time resolution, transforming the set of received time-domain OFDM symbols into a corresponding set of frequency-domain modulation symbols, calculating channel samples based on the at least one prior known signal, and accumulating the channel samples coherently over time in two or more sub-bands, respectively, determining the linear phase slope from the at least two coherently averaged channel samples, wherein the phase slope is determined using a third time resolution which is larger than the second time resolution, determining the optimum radio frame start according to a the third resolution, calculating a new radio frame start position according to the second time resolution by a floor operation on the quotient between the radio frame start position expressed in the third time resolution and the ratio between the second and the third time resolutions, and calculating the remainder in the third time resolution by subjecting the frame start position expressed in the third time resolution to a modulo-K operation (or the alike), where K is the ratio between the second and the third time resolutions. If needed, the method further comprises adjusting the radio frame start according to the second resolution and adjusting the sample phase according to the remainder expressed in the third resolution.

In exemplary embodiments, the first and the third time resolution are the same.

In exemplary embodiments, the first time resolution is larger than the third time resolution.

In exemplary embodiments, the ratio between the third and the second time resolutions is an integer.

In exemplary embodiments, the ratio between the first and the second time resolutions is an integer.

In exemplary embodiments, the known signal is a synchronization signal, a reference or pilot signal, or a discovery signal.

In exemplary embodiments, the known signal is a data allocation with prior known or predictable contents.

In exemplary embodiments, the known signal is a master information block.

In exemplary embodiments, the subband refers to a single subcarrier, e.g., one coherent average is determined per subcarrier carrying the known signal.

In exemplary embodiments, the subband refers to a group of adjacent subcarriers, e.g., one coherent average is determined per group of subcarriers carrying the known signal.

In exemplary embodiments, the phase slope is hypothesized over a grid of phase slopes, whereby the determined phase slope is the selected as the hypothesis that yields the best metrics.

In exemplary embodiments, the phase slope is determined by curve fitting (e.g., least squares and the alike)

In exemplary embodiments, a linear phase bias is applied to create an offset between the radio frame start and the sample grid based on the second time resolution.

In exemplary embodiments, residual, as expressed in the third sampling rate, is compensated by adjusting the sample phase in an ADC or a decimator.

Various elements disclosed herein are described as or represent some kind of circuit, e.g., a transmitter, receiver, receiver interface circuit, frequency transformation circuit, jitter compensation circuit, channel estimation circuit, detection circuit, tracking circuit, timing discrepancy circuit, timing adjustment circuit, timing advance circuit, sample selection circuit, etc. Each of these circuits may be embodied in hardware and/or in software (including firmware, resident software, microcode, etc.) executed on a controller or processor, including an application specific integrated circuit (ASIC).

Further embodiments are:

28. A transceiver apparatus (300) comprising a transmitter apparatus (310) and a receiver apparatus (320), the transmitter apparatus configured to transmit first symbols, the transceiver apparatus comprising:

a timing discrepancy module (330) configured to determine a timing discrepancy between a previous reference timing and a current reference timing, said current reference timing being established responsive to a reduced sampling rate used to process second symbols received by the receiver, wherein the reduced sampling rate is less than a minimum sampling rate at which an inter-symbol distance between the second symbols can be represented by an integer number of samples;

a timing adjustment module (340) configured to adjust the current reference timing responsive to the timing discrepancy to generate an adjusted reference timing; and a timing advance module (350) configured to determine an uplink transmission timing responsive to the adjusted reference timing;

wherein the transmitter apparatus (310) is configured to transmit the first symbols according to the determined uplink transmission timing.

29. The transceiver apparatus of embodiment 28 wherein the timing adjustment module is configured to adjust the current reference timing by:

determining a fine reference timing responsive to the timing discrepancy, the fine reference timing having a first time resolution;

determining a coarse reference timing responsive to the timing discrepancy, the coarse reference timing having a second time resolution lower than the first time resolution;

wherein the fine reference timing corresponds to the minimum sampling rate and the coarse reference timing corresponds to the reduced sampling rate.

30. The transceiver apparatus of embodiment 28 wherein a ratio of the minimum sampling rate to the reduced sampling is an integer, and wherein a ratio of the first time resolution to the second time resolution is the integer.

31. The transceiver apparatus of embodiment 28 further comprising a sample selection module configured to adjust the receiver apparatus responsive to the determined fine reference timing to select a sample output by the receiver apparatus based on the determined fine reference timing.

32. The transceiver apparatus of embodiments 28-31 further comprising a baseband module comprising:
a frequency transformation module (322) configured to execute a frequency transformation of radio samples produced by a sampling of one of the second symbols at the reduced sampling rate to generate a plurality of frequency-domain resource elements;
a channel estimation module (324) configured to determine channel estimates for each subcarrier using the corresponding plurality of frequency-domain resource elements containing known Information;
wherein the timing discrepancy module determines the timing discrepancy by:
averaging the channel estimates per subcarrier to determine average channel estimates per subcarrier; and
determining the timing discrepancy using the average channel estimates.

33. The transceiver apparatus of embodiment 32 further comprising a jitter compensation module (323) configured to:
determine a sample offset corresponding to a symbol number for the second symbol, said sample offset representing a difference between an actual sample start time and a desired sample start time;
determine, using the sample offset, a phase offset for each of the resource elements; and reduce inter-symbol jitter between the second symbols by rotating each resource element using the corresponding phase offset to generate phase-rotated resource elements;
wherein the channel estimation module is configured to determine the channel estimates for each subcarrier using the corresponding phase-rotated resource elements 34. The transceiver apparatus of embodiment 32 wherein the timing discrepancy module determines the timing discrepancy using the average channel estimates by: determining a phase relationship between the average channel estimates per subcarrier, and determining the timing discrepancy using the phase relationship per subcarrier.

35. The transceiver apparatus of embodiment 34 wherein the timing discrepancy module determines the timing discrepancy by determining a value for γ that maximizes:

$$P(\gamma) = \left| \sum_{\forall k} X_k e^{-\frac{j2\pi\gamma k}{N}} e^{\frac{j2\pi\rho k}{N}} \right|^2$$

where γ represents a fractional coarse sample offset, $X_k$ represents the average channel estimates for the $k^{th}$ subcarrier, ρ represents an offset between a radio frame start and a coarse sampling grid corresponding to the reduced sampling rate, and N represents a size of a frequency transform circuit it the receiver.

36. The transceiver apparatus of embodiments 32-35 wherein the plurality of frequency-domain resource elements containing known information comprise the plurality of frequency domain resource elements containing at least one of reference signals, synchronization signals, and broadcast channel signals.

37. The transceiver apparatus of embodiments 28-36 wherein at least one of the first symbols and the second symbols comprise Orthogonal Frequency Division Multiplex (OFDM) symbols.

38. The transceiver apparatus of embodiments 28-36 wherein at least one of the first symbols and the second symbols comprise single-tone symbols.

39. The transceiver apparatus of embodiments 28-36 wherein at least one of the first symbols and the second symbols comprise multi-tone symbols.

40. The transceiver apparatus of embodiments 28-39 wherein the transceiver apparatus is comprised in a device apparatus.

41. The transceiver apparatus of embodiment 40 wherein the device apparatus comprises one of a tablet, personal computer, mobile telephone, set-top box, sensor, and camera.

The present solution may, of course, be carried out in other ways than those specifically set forth herein without departing from essential characteristics of the solution. The present embodiments are to be considered in all respects as Illustrative and not restrictive, and all changes coming within the meaning and equivalency range of the embodiments are intended to be embraced therein.

The invention claimed is:

1. A method of transmitting first symbols via a transceiver comprising a receiver and a transmitter, the method comprising:
determining a timing discrepancy between a previous reference timing and a current reference timing, said current reference timing being established responsive to a reduced sampling rate used to process second symbols received by the receiver, wherein the reduced sampling rate is less than a minimum sampling rate at which an inter-symbol distance between the second symbols can be represented by an integer number of samples;
adjusting the current reference timing responsive to the timing discrepancy to generate an adjusted reference timing;
determining an uplink transmission timing responsive to the adjusted reference timing; and
transmitting the first symbols via the transmitter according to the determined uplink transmission timing.

2. The method of claim 1 wherein adjusting the current reference timing comprises:
determining a fine reference timing responsive to the timing discrepancy, the fine reference timing having a first time resolution;
determining a coarse reference timing responsive to the timing discrepancy, the coarse reference timing having a second time resolution lower than the first resolution;
wherein the fine reference timing corresponds to the minimum sampling rate and the coarse reference timing corresponds to the reduced sampling rate.

3. The method of claim 2 wherein a ratio of the minimum sampling rate to the reduced sampling is an integer, and wherein a ratio of the first time resolution to the second time resolution is the integer.

4. The method of claim 2 further comprising adjusting the receiver responsive to the determined fine reference timing to select a sample output by the receiver based on the determined fine reference timing.

5. The method of claim 1 further comprising:
receiving a plurality of frequency-domain resource elements derived from a frequency transformation of radio samples produced by a sampling of one of the second symbols at the reduced sampling rate;

determining channel estimates for each subcarrier using the corresponding plurality of frequency-domain resource elements containing known information;

wherein determining the timing discrepancy comprises:
averaging the channel estimates per subcarrier to determine average channel estimates per subcarrier; and
determining the timing discrepancy using the average channel estimates.

6. The method of claim 5 further comprising:
determining a sample offset corresponding to a symbol number for the second symbol, said sample offset representing a difference between an actual sample start time and a desired sample start time;
determining, using the sample offset, a phase offset for each of the resource elements; and
reducing inter-symbol jitter between the second symbols by rotating each resource element using the corresponding phase offset to generate phase-rotated resource elements;
wherein determining the channel estimates for each subcarrier comprises determining the channel estimates for each subcarrier using the corresponding phase-rotated resource elements.

7. The method of claim 5 wherein determining the timing discrepancy using the average channel estimates comprises:
determining a phase relationship between the average channel estimates per subcarrier; and
determining the timing discrepancy using the phase relationship per subcarrier.

8. The method of claim 5 wherein the plurality of frequency-domain resource elements containing known information comprise the plurality of frequency domain resource elements containing at least one of reference signals, synchronization signals, and broadcast channel signals.

9. The method of claim 1 wherein at least one of the first symbols and the second symbols comprise Orthogonal Frequency Division Multiplex (OFDM) symbols.

10. The method of claim 1 wherein at least one of the first symbols and the second symbols comprise single-tone symbols.

11. The method of claim 1 wherein at least one of the first symbols and the second symbols comprise multi-tone symbols.

12. A transceiver comprising a transmitter and a receiver, the transmitter configured to transmit first symbols, the transceiver comprising:
a timing discrepancy circuit configured to determine a timing discrepancy between a previous reference timing and a current reference timing, said current reference timing being established responsive to a reduced sampling rate used to process second symbols received by the receiver, wherein the reduced sampling rate is less than a minimum sampling rate at which an inter-symbol distance between the second symbols can be represented by an integer number of samples;
a timing adjustment circuit configured to adjust the current reference timing responsive to the timing discrepancy to generate an adjusted reference timing; and
a timing advance circuit configured to determine an uplink transmission timing responsive to the adjusted reference timing;
wherein the transmitter is configured to transmit the first symbols according to the determined uplink transmission timing.

13. The transceiver of claim 12 wherein the timing adjustment circuit is configured to adjust the current reference timing by:
determining a fine reference timing responsive to the timing discrepancy, the fine reference timing having a first time resolution;
determining a coarse reference timing responsive to the timing discrepancy, the coarse reference timing having a second time resolution lower than the first time resolution;
wherein the fine reference timing corresponds to the minimum sampling rate and the coarse reference timing corresponds to the reduced sampling rate.

14. The transceiver of claim 13 wherein a ratio of the minimum sampling rate to the reduced sampling is an integer, and wherein a ratio of the first time resolution to the second time resolution is the integer.

15. The transceiver of claim 13 further comprising a sample selection circuit (360) configured to adjust the receiver responsive to the determined fine reference timing to select a sample output by the receiver based on the determined fine reference timing.

16. The transceiver of claim 12 further comprising a baseband circuit comprising:
a frequency transformation circuit configured to execute a frequency transformation of radio samples produced by a sampling of one of the second symbols at the reduced sampling rate to generate a plurality of frequency-domain resource elements;
a channel estimation circuit configured to determine channel estimates for each subcarrier using the corresponding plurality of frequency-domain resource elements containing known information;
wherein the timing discrepancy circuit determines the timing discrepancy by:
averaging the channel estimates per subcarrier to determine average channel estimates per subcarrier; and
determining the timing discrepancy using the average channel estimates.

17. The transceiver of claim 16 further comprising a jitter compensation circuit configured to:
determine a sample offset corresponding to a symbol number for the second symbol, said sample offset representing a difference between an actual sample start time and a desired sample start time;
determine, using the sample offset, a phase offset for each of the resource elements; and
reduce inter-symbol jitter between the second symbols by rotating each resource element using the corresponding phase offset to generate phase-rotated resource elements;
wherein the channel estimation circuit is configured to determine the channel estimates for each subcarrier using the corresponding phase-rotated resource elements.

18. The transceiver of claim 16 wherein the timing discrepancy circuit determines the timing discrepancy using the average channel estimates by:
determining a phase relationship between the average channel estimates per subcarrier; and
determining the timing discrepancy using the phase relationship per subcarrier.

19. The transceiver of claim 16 wherein the plurality of frequency-domain resource elements containing known information comprise the plurality of frequency domain resource elements containing at least one of reference signals, synchronization signals, and broadcast channel signals.

20. The transceiver of claim 12 wherein at least one of the first symbols and the second symbols comprise Orthogonal Frequency Division Multiplex (OFDM) symbols.

21. The transceiver of claim 12 wherein at least one of the first symbols and the second symbols comprise single-tone symbols.

22. The transceiver of claim 12 wherein at least one of the first symbols and the second symbols comprise multi-tone symbols.

23. The transceiver of claim 12 wherein the transceiver is comprised in a device.

24. The transceiver of claim 23 wherein the device comprises one of a tablet, personal computer, mobile telephone, set-top box, sensor, and camera.

25. A non-transitory computer readable medium storing a computer program product for controlling the transmission of first symbols, the computer program product comprising software instructions which, when run on a processing circuit causes the processing circuit to:

determine a timing discrepancy between a previous reference timing and a current reference timing, said current reference timing being established responsive to a reduced sampling rate used to process second symbols received by the receiver, wherein the reduced sampling rate is less than a minimum sampling rate at which an inter-symbol distance between the second symbols can be represented by an integer number of samples;

adjust the current reference timing responsive to the timing discrepancy to generate an adjusted reference timing;

determine an uplink transmission timing responsive to the adjusted reference timing; and transmit the first symbols according to the determined uplink transmission timing.

* * * * *